United States Patent
Matthias et al.

(10) Patent No.: US 12,214,508 B2
(45) Date of Patent: Feb. 4, 2025

(54) ROBOTIC SYSTEM COMPRISING A MOVABLE ROBOT

(71) Applicant: ABB Schweiz AG, Baden (CH)

(72) Inventors: Bjoern Matthias, Ladenburg (DE);
Rene Kirsten, Ladenburg (DE);
Christoph Byner, Ladenburg (DE)

(73) Assignee: ABB Schweiz AG, Baden (CH)

( * ) Notice: Subject to any disclaimer, the term of this patent is extended or adjusted under 35 U.S.C. 154(b) by 338 days.

(21) Appl. No.: 17/702,141

(22) Filed: Mar. 23, 2022

(65) Prior Publication Data

US 2022/0212344 A1 Jul. 7, 2022

Related U.S. Application Data

(63) Continuation of application No. PCT/EP2019/075771, filed on Sep. 24, 2019.

(51) Int. Cl.
*B25J 9/16* (2006.01)

(52) U.S. Cl.
CPC ............. *B25J 9/1674* (2013.01); *B25J 9/162* (2013.01); *B25J 9/1697* (2013.01)

(58) Field of Classification Search
CPC ......... B25J 9/1674; B25J 9/162; B25J 9/1697
See application file for complete search history.

(56) References Cited

U.S. PATENT DOCUMENTS 8,041,456 B1 * 10/2011 Blackwell .............. B25J 9/1674
901/1
2006/0091842 A1 5/2006 Nishiyama
2010/0010672 A1 * 1/2010 Wang ................... G05D 1/0242
901/1
2014/0135984 A1 * 5/2014 Hirata ..................... B25J 19/06
700/255
2015/0168174 A1 * 6/2015 Abramson ......... G01C 21/3484
701/408
2016/0271800 A1 * 9/2016 Stubbs .................. B25J 9/1666
2016/0274586 A1 * 9/2016 Stubbs .................. B25J 9/1676
2018/0215040 A1 * 8/2018 Asahara ............... G05D 1/0214
2019/0101901 A1 * 4/2019 Zimmermann .... G05B 19/4185
2019/0351547 A1 * 11/2019 Onuma .................. B25J 5/007
2020/0047343 A1 * 2/2020 Bal ........................ B25J 9/1689
2021/0046655 A1 * 2/2021 Deyle ................... B25J 9/1664

FOREIGN PATENT DOCUMENTS

CN 107407936 A 11/2017
EP 3357648 A1 8/2018

OTHER PUBLICATIONS

European Patent Office, International Search Report in International Patent Application No. PCT/EP2019/075771, 3 pp. (Jul. 3, 2020).
European Patent Office, Written Opinion in International Patent Application No. PCT/EP2019/075771, 7 pp. (Jul. 3, 2020).

* cited by examiner

*Primary Examiner* — Jaime Figueroa
*Assistant Examiner* — Mohamad O El Sayah
(74) *Attorney, Agent, or Firm* — Leydig, Voit & Mayer, Ltd.

(57) ABSTRACT

A robotic system and method includes at least one robot actively or passively mobile between at least first and second locations, and a first safety configuration being defined at least for said first location. A first data carrier associated to the first safety configuration is located in said first location, and the robot comprises a reader adapted to read the first data carrier when the robot is in said first location.

16 Claims, 2 Drawing Sheets

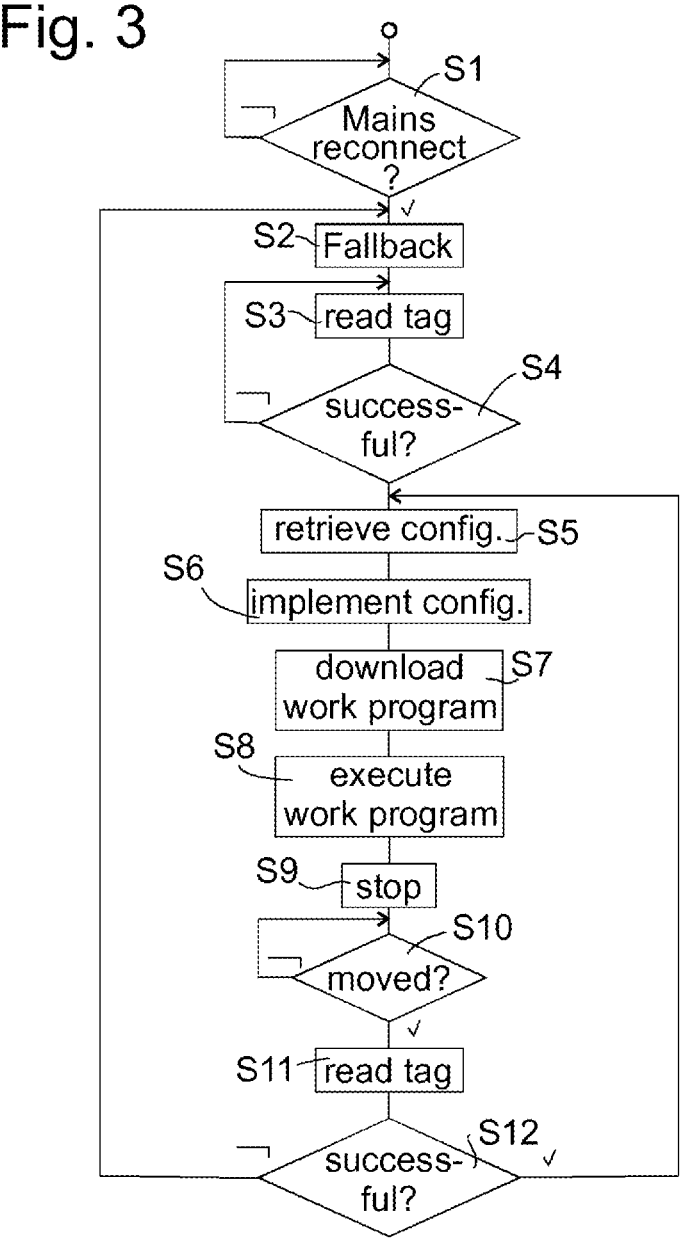

ROBOTIC SYSTEM COMPRISING A MOVABLE ROBOT

CROSS-REFERENCE TO RELATED APPLICATIONS

This patent application claims the benefit of International Patent Application Ser. No. PCT/EP2019/075771, filed on Sep. 24, 2019, in the English language, which is incorporated herein in its entirety by reference.

FIELD OF THE DISCLOSURE

The present disclosure relates to robotic systems and methods.

BACKGROUND OF THE INVENTION

A robot conventionally comprises a controller, a base and an end effector that is movable with respect to the base by the controller. The base may be stationary, it may be equipped with casters or the like that facilitate the robot being passively moved from one location to another, or it may comprise a travelling mechanism facilitating active movement of the robot. In the following description, if nothing else is said, any change of position of the end effector relative to the base will be referred to as a movement or displacement of the end effector, whereas a movement of the robot will refer to a change of position of the robot as a whole, including its base.

In order to ensure operational safety of a robot, in particular in order to minimize the risk of injury to persons who cooperate with the robot, a safety configuration must be defined which imposes limits on operating parameters such as speed, position or force of the robot which, while restricting the freedom of movement of the robot's end effector not more than necessary, will ensure that contact between man and robot is avoided or, at least, can occur only at harmless levels of speed or force. The safety configuration may also impose limitations on the operation of other equipment present at the location, e.g. a conveyor, and/or may prescribe the presence of specific perimeter guarding apparatus. The safety configuration is inherently location-specific, i.e. when a robot is moved from one location to another, it will have to implement a new safety configuration associated to the new location.

Designing a safety configuration requires expert labor and is therefore expensive.

Quite frequently, the productivity of a robot is so high that it isn't continuously occupied by the work to be done at a specific location, so that in order to make efficient use of the robot, it may be desirable to move it to a new location from time to time. For regulatory reasons it may be necessary to have skilled staff ensure that when a robot is put to use in a new location, the appropriate safety configuration is implemented, which makes moving the robot costly and time-consuming.

While in the past robots tended to be only passively mobile and were moved rather infrequently, the problem is aggravated by the advent of actively mobile robots capable of autonomously selecting and moving to a location where they are needed. Any productivity gains to be achieved by the ability of the robot to judge where it is needed and move there would be thwarted if at the new location there is no staff present to verify the implementation of the appropriate safety configuration and to authorize operation of the robot.

BRIEF SUMMARY OF THE INVENTION

The present disclosure relates to robotic systems and, more specifically, to an exemplary embodiment of a robotic system in which at least one robot can be used successively in different locations, or where a given location can be occupied by different robots at different times.

In one general aspect, the present disclosure describes a robotic system and an operating method that enable operation of a mobile robot with high efficiency while respecting any safety-related constraints.

BRIEF DESCRIPTION OF THE SEVERAL VIEWS OF THE DRAWING(S)

FIG. 3 is a flowchart of a method of operating a robot in the system of FIG. 2.

DETAILED DESCRIPTION OF THE INVENTION

Figure 1:
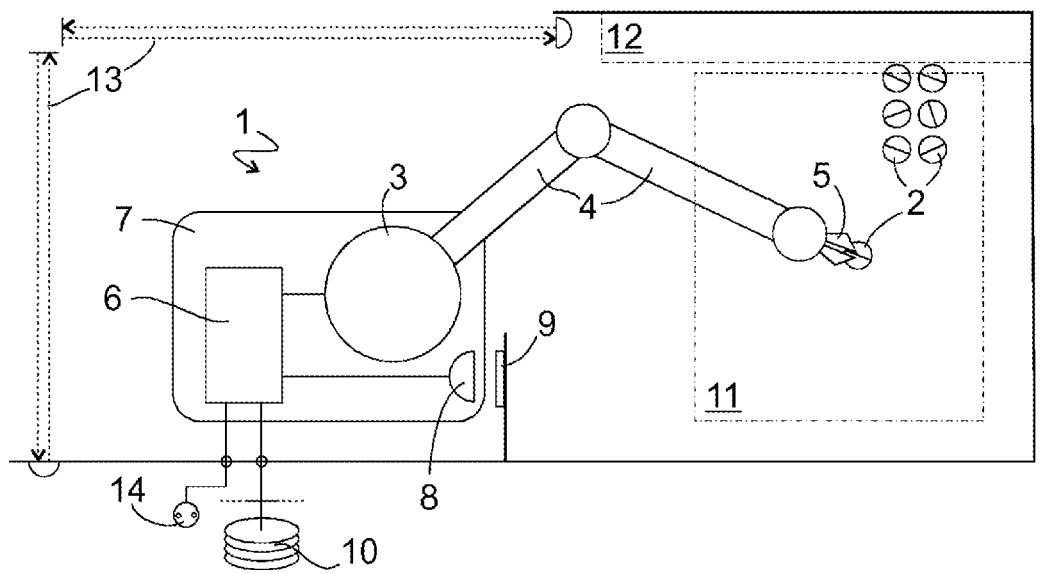
FIG. 1 is a schematic plan view of a location in which a robot may be located in order to carry out a specific task, in accordance with the disclosure.

FIG. 1 schematically illustrates a location in which a robot 1 is placed for carrying out a predetermined work program on workpieces 2, which may be held in stock at the location for the robot 1 to pick a new workpiece 2 from the stock when work on a previous workpiece is finished, or which may be brought within reach of the robot at regular intervals by a conveyor or the like.

The robot 1 has an articulated arm of conventional design, comprising a base 3, an end effector 5 and a plurality of links 4 connected to each other, to the base 3 and to the end effector 5 by revolute or prismatic joints, and a controller 6 for controlling movements of the arm, i.e. of end effector 5 relative to base 3. Incidentally, the arm and the controller 6 are mounted on a travelling mechanism such as a carriage 7 with a plurality of motorized casters or crawlers (not shown), and the controller 6 is adapted to control orientation and speed of the casters or the speed of the crawlers so as to be able to move the robot 1 to another location when required.

An optical reader 8, e.g. a bar code or QR code scanner, is mounted on carriage 7. Such readers are in widespread use in POS equipment and are known to be able to identify and to read a code under widely varying angles and with a high reliability. A tag 9 having a code compatible with reader 8 printed on it is affixed to a surface of the location selected so as to be visible from the point of view of the reader 8.

In principle, a complete safety configuration for the location shown in FIG. 1 might be encoded in the tag 9. Preferably, what is encoded in the tag 9 is a reference, e.g. an address or a link, to a centralized storage 10 where the safety configuration can be accessed and downloaded to the controller 6, or a station ID which is unique to the location where the robot is currently placed, and which can be read by the reader 8 and used by controller 6 to query the safety configuration associated to the location from centralized storage 10. Thus, the safety configuration can be updated whenever necessary without having to replace the tag 9.

The safety configuration can impose various types of restrictions on the mobility of the arm. It may define a region 11 which the end effector 5 isn't allowed to leave while working at the location, it may impose a speed limit for parts of the robot 1 outside region 11, it may define a region 12 surrounding walls or other immobile objects of the location which no part of the robot may enter in order to prevent squeezing a human between the robot and the immobile object. The safety configuration may further identify perimeter guard devices 13 which are required to handshake with the controller 6 in order to demonstrate that they are present and operative, etc., so that e.g. an emergency shutdown of the robot 1 can be triggered if a perimeter guard device 13 detects intrusion of a person into a region reserved to the robot 1.

In an alternative embodiment, the reader 8 is mounted on a distal link 4 of the arm, along with end effector 5. In that way, if the reader 8 fails to read the tag 9, e.g. due to an obstacle in between blocking the line of sight, the robot may cautiously, by referring to a fallback configuration, move the reader and try to find a position from which the tag 9 can be read. In this embodiment, it can be advantageous to facilitate finding a legible tag 9 by affixing it at various positions of the location.

In a further alternative embodiment, the tag 9 is an RFID tag, and the reader 8 is an RFID reader. The RFID reader can read the RFID tag even if a direct line if sight between the two is blocked. The RFID tag can be designed to harvest the energy it needs for transmitting its data to the reader 8 from a query signal transmitted by the reader 8.

It is also possible to combine visual and radio detection, e.g. by using a tag 9 which is both visually distinctive and capable of radio communication, so that in a first step, a camera of the robot 1 may be used to detect the tag 9 and to control movement of the RFID reader so that its detection range comes to overlap the tag 9.

Figure 2:
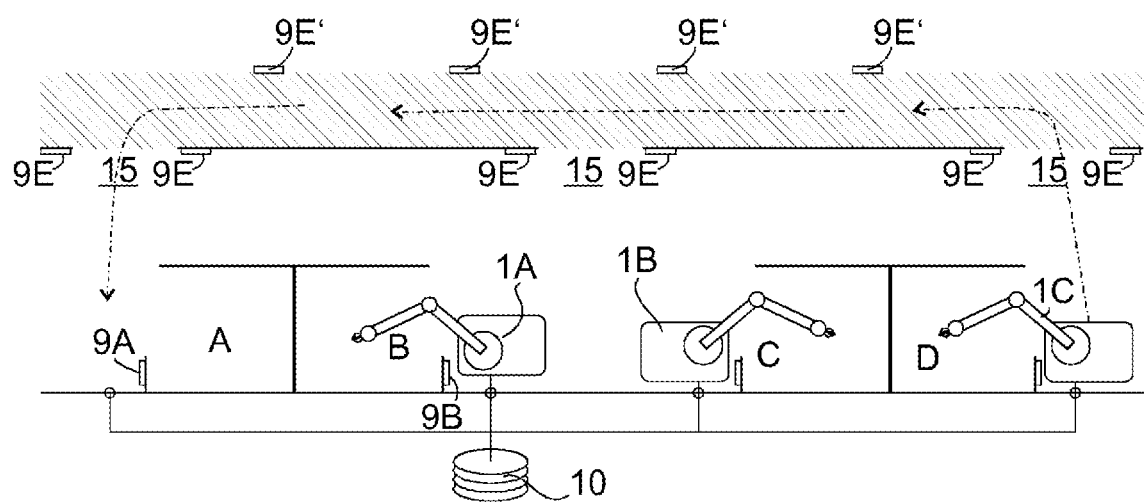
FIG. 2 is a schematic plan view of a robotic system comprising a plurality of locations and a plurality of robots that can move from one of the locations to another in order to carry out allotted tasks, in accordance with the disclosure.

FIG. 2 is a schematic plan view of a robotic system comprising a plurality of locations A-D where specific tasks can be carried out by robots 1A-1C of the type described above. For the sake of simplicity it shall be assumed that each of the robots 1A-1C is suitable for each of the tasks. Since the number of robots is smaller than that of the locations where tasks are carried out, workpieces will be accumulating at an unoccupied location, for instance at location B. Therefore, at some instant in time, when supply of workpieces at location A was exhausted, robot 1A has moved from location A to location B and has connected to a mains voltage supply 14 (see FIG. 1) there.

Controller 6 of robot 1A, upon detecting (FIG. 3, step S1) that the mains voltage has been reconnected, decides that a change of location might have taken place, and that a previously stored safety configuration is likely to be invalid. (In an alternative embodiment, the controller 6 might be programmed to poll at regular intervals whether there is a tag 9 within detection range of reader 8, and to invalidate a previously stored safety configuration if no tag 9 is found within the detection range or if a tag 9 is found, but its identity is different from that of the tag detected in the preceding poll.) It therefore switches over (S2) to a fallback configuration which, if at all, allows the end effector 5 to move only at a very low speed or with a very small force. It then instructs reader 8 to read a reference to a valid safety configuration from tag 9 (S3). If reading is successful (S4), controller 6 retrieves (S5) the safety configuration identified by the reference from storage 10 and implements it (S6). Controller 6 further downloads (S7) a program defining the movements to be carried out by end effector 5 in order to accomplish the work at location B, and sets out to work (S8).

Assuming that workpieces at location B are prepared at location A, location B will sooner or later run out of supply while location A is vacant. Therefore, at some later time, Robot 1C, currently busy with step S8 of the method of FIG. 3, will stop work (S9) and leave location D in order to occupy location A. When it is found (S10) that the carriage 7 of robot 1B has moved over a predetermined distance (thus leaving an allowed working range of location D) the safety configuration of location D is invalidated, and the robot 1B looks for a reference to a new safety configuration using reader 9 (S11).

If the attempt fails, the method reverts to step S2, i.e. the robot 1B is compelled to implement the fallback configuration and thus to move slowly. If the complete path to location A had to be gone through at such a low speed, moving to location A might take prohibitively wrong. In order to avoid this, a robot highway E (FIG. 2) is provided linking locations A-D which humans aren't allowed to enter and where the robots may therefore move fast. At each entry point 15 to the highway E there is a tag 9E that will be read by the robot 1B looking for it in step S3. A safety configuration referred to by said tag 9E can be valid for the entire highway E, preferably it is valid only for the particular stretch of highway E that follows the tag 9E. Implementation of this safety configuration (S4-S6) enables the robot 1B to circulate on highway E at a maximum speed defined in the safety configuration. Thus, highway E is handled just like one of locations A-D, with the only exception that there is no work program to be carried out, i.e. steps S7 and S8 are without effect when carried out by robot 1C passing one of highway entry points 15.

Along the highway E, tags 9E' are placed so as to be visible for the robot after having gone through the predetermined distance, i.e. so that when step S11 is invoked by robot 1C moving along the highway, there is a tag 9E' to be found, and reading step S12 can be carried out successfully. In that way the robot 1C can continuously run at high speed while on the highway E. If the robot 1C fails to find a new tag 9E', it will revert to fallback configuration (S2). In this way it can be ensured that even if robot 1B leaves the highway E by accident, it will stop going at the high speed and will not pose a safety threat, even if it has left highway E by accident.

Further, tags 9E' distributed along the highway allow to impose different safety configurations for different sections of the highway E, e.g. a speed limit at a turn or at a crossroads.

When the robot 1C has successfully reached location A, the tag it will come to see in step S11 is tag 9A of location A, causing it to revert to step S5 and thus to download and implement (S6) the safety configuration of location A, to download the work program of location A (S7) and to execute the latter (S8).

According to a first aspect of the invention, the disclosure describes a system and method in which a robotic system comprising at least one robot is actively or passively mobile between at least first and second locations, a first safety configuration being defined at least for said first location, characterized in that a first data carrier associated to the first safety configuration is located in said first location and in that the robot comprises a reader adapted to read the first data carrier when the robot is in said first location.

Thus, whenever the robot is moved to the first location, it can identify the safety configuration relevant for this location, i.e. the first safety configuration, by the reader accessing the data carrier. In order to make sure that the data carrier is read correctly, a rated reader (PLd/Cat3 or higher) can be used; such readers are available on the market; verification by dedicated staff is thus made obsolete.

Readers of various types can be used, the present invention not being limited with respect to the means by which the required degree of reliability is achieved, or with respect to the reading technology.

Concerning the reading technology, the reader may be an optical device such as a camera, a laser scanner or the like. In that case the data carrier may be a printed label, e.g. a QR code sticker. By placing the data carrier in a way so as not to be visible from other locations, it can be ensured that the safety configuration it refers to will be implemented if, and only if, the robot is in the first location.

Alternatively, the reader may be a radio device adapted to communicate with the data carrier by means of radio waves. By using a short-range radio communication technology such as NFC, RFID or Bluetooth, it can be ensured that the first data carrier cannot be read from any other location except the first, thus ensuring that the safety configuration referred to by the first data carrier will be implemented if, and only if, the robot is in the first location.

The data carrier should be adapted to respond to a query from the reader. In that way availability of the data is ensured without the data carrier continuously having to broadcast them. In that way radio pollution is minimized, and the radio bandwidth required for reading the data carrier can be kept small. Further, since energy consumption of the data carrier is thus kept low, wiring the data carrier to a power supply can be avoided. In practice, in particular if an RFID transponder is used as the data carrier, the energy needed for broadcasting the data stored in the first data carrier may be harvested by the data carrier from the query signal.

The reader may be located wherever appropriate at the robot; it can be fixed with respect to the base of the robot, in that case its position at a given location is predictable, and a position of a tag at the location can be selected so that the tag is easy to read from the predicted position of the reader.

Alternatively, it may be advantageous to place the reader in the vicinity of an end effector, so as to be movable with the latter; in that case the reader can be moved in case that the reader initially fails to detect the data carrier, to a position where the data carrier can be detected.

At said second location, a second safety configuration may be defined, and a second data carrier associated to said second safety configuration may be provided at said second location and adapted to be read by said reader when the robot is in said second location. In that way, the robot is capable of updating its safety configuration whenever it is moved or moves from the first location to the second or back. In practice there is no upper limit to the number of locations and associated safety configurations the robotic system may have.

The first data carrier should be located so as not to be readable by said reader when the robot is in said second location, and/or vice versa. In that way implementation of a safety configuration that is not associated to the location the robot is in can be safely prevented.

In order to safely prevent inappropriate movements of the robot in case that the data carrier cannot be read correctly, the robot may store a fallback safety configuration and is adapted to use the fallback safety configuration if an attempt at reading a data carrier fails, for example because there is no direct line of sight between the reader and the data carrier, or because the nearest data carrier is outside the detection range of the reader. In the simplest of cases the fallback configuration may prohibit any operation of the robot, but since this case cannot be straightforwardly distinguished from some technical failure, it is preferred that the fallback configuration allows for limited mobility of the end effector. If the reader is movable along with the end effector as described above, the mobility conceded by the fallback configuration should at least be sufficient for moving the reader to a position from where the data carrier can be read.

In a preferred embodiment, the fallback configuration doesn't impose a limitation on positions the end effector can assume relative to the base, but speed and force of end effector movement are set to levels low enough to ensure that a person cannot be hit or squeezed.

In case of the robot being actively movable, in particular if it is designed to move autonomously from one location to another, the fallback configuration may also be applicable while the robot is moving.

At least if the robot is moved passively, it will have to stop working while being moved. Therefore, any interruption of work might be indicative of the robot having been moved to a new location. In order to ensure that the appropriate safety configuration is implemented, the robot should be adapted to attempt to read a data carrier when resuming work after an interruption.

If the robot is actively mobile, it should be adapted to attempt to read a data carrier after having actively moved by a predetermined distance. If such a data carrier is found, its associated safety configuration may e.g. allow the robot to move faster to a target location than the fallback configuration would do, thus minimizing the time spent unproductively on displacement.

According to a second aspect of the invention, the object is achieved by a method of operating a robot in a robotic system comprising at least first and second locations and at least one robot actively or passively mobile between said first and second locations, the method comprising the steps of a) moving the robot to a first location having a first safety configuration associated to it;
b) searching, using a reader of said robot, for a first data carrier in said first location;
c) when the first data carrier is found, reading it in order to retrieve the first safety configuration; and
d) when the first safety configuration is retrieved, implementing it in the robot.

Execution of a work program by the robot should be inhibited unless the first safety configuration has been implemented.

Finally, according to a third aspect, the object is achieved by a software product comprising instructions which, when executed by a robot, cause the robot to carry out the above-described method.

Further features and advantages of the invention will become apparent from the foregoing description of embodiments thereof, referring to the appended drawings.

LIST OF REFERENCE NUMERALS 1, 1A, 1B, 1C robot
2 workpiece
3 base
4 link
5 end effector
6 controller
7 carriage
8 reader
9, 9A, . . . , 9E, 9E' tag
10 storage 11 region
12 region
13 perimeter guard device
14 mains voltage supply
15 highway entry point All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A robotic system, comprising:
    at least one robot that is actively or passively mobile between a first location and a second location; and
    a first safety configuration being defined at least for the first location;
    wherein a first data carrier is associated with the first safety configuration and is located in the first location;
    wherein the at least one robot comprises a reader configured to read the first data carrier when the robot is in the first location, the robot further configured to invalidate the first safety configuration in response to moving a predetermined distance, leaving a working range of the first location, and identifying that the at least one robot has reconnected to a mains voltage supply, and attempt to read a second data carrier to retrieve a second safety configuration of the second location.

2. The robotic system of claim 1, wherein the first data carrier stores one of the first safety configuration and a reference to a storage device, which is accessible to the robot and which stores the first safety configuration.

3. The robotic system of claim 1, wherein the reader is an optical device.

4. The robotic system of claim 1, wherein the reader is a radio device.

5. The robotic system of claim 4, wherein the first data carrier is configured to respond to a query from the reader.

6. The robotic system of claim 1, wherein the at least one robot comprises a base and an end effector that is movable with respect to the base, and wherein the reader is fixed with respect to the base.

7. The robotic system of claim 1, wherein the robot comprises a base and an end effector that is movable with respect to the base, and wherein the reader is disposed adjacent to and movable with the end effector with respect to the base.

8. The robotic system of claim 1, wherein the second safety configuration is defined for the second location, and the second data carrier associated with the second safety configuration is provided at the second location, wherein the second data carrier is configured to be read by the reader when the robot is in the second location.

9. The robotic system of claim 8, wherein the first data carrier is located so as not to be readable by the reader when the robot is in the second location.

10. The robotic system of claim 1, wherein the at least one robot stores a fallback safety configuration and is adapted to use the fallback safety configuration if an attempt at reading the first data carrier fails when the robot is at or approaching the first location.

11. The robotic system of claim 1, wherein the robot is configured to attempt to read a data carrier when resuming work after an interruption.

12. The robotic system of claim 1, wherein the reference is an address or a link to a centralized storage, and wherein the at least one robot is further configured to download the first safety configuration from the centralized storage in response to the reader reading the first data carrier.

13. A method of operating a robot in a robotic system, the robotic system comprising a first location, a second location, and at least one robot, the at least one robot being actively or passively mobile between the first and second locations, the method comprising:
    a) moving the at least one robot to the first location, the first location having a first safety configuration associated therewith;
    b) searching, using a reader of said robot, for a first data carrier in the first location;
    c) when the first data carrier is found, reading it using the reader in order to retrieve the first safety configuration;
    d) when the first safety configuration is retrieved, implementing the first safety configuration in the first robot; and
    e) invalidate the first safety configuration in response to the robot moving a predetermined distance, having left a working range of the first location, and identifying that the robot has reconnected to a mains voltage supply, and attempt to read a second data carrier to retrieve a second safety configuration of the second location.

14. The method of claim 13, wherein execution of a work program by the robot is inhibited unless the first safety configuration has been implemented.

15. A non-transitory storage media storing a software product comprising executable instructions stored in the non-transitory media, which, when the executable instructions are executed by a computer associated with a robot, cause the robot to:
   a) moving to a first location in a robotic system, the first location having a first safety configuration associated therewith;
   b) search, using a reader of the robot, for a first data carrier in the first location;
   c) when the first data carrier is found, read the first data carrier it using the reader in order to retrieve the first safety configuration;
   d) when the first safety configuration is retrieved, implement the first safety configuration in the first robot; and
   e) invalidate the first safety configuration in response to the robot moving a predetermined distance, having left a working range of the first location, and identifying that the robot has reconnected to a mains voltage supply, and attempt to read a second data carrier to retrieve a second safety configuration of the second location.

16. The software product of claim 15, further comprising instructions that cause the robot to inhibit execution of a work program unless the first safety configuration has been implemented.

* * * * *